United States Patent
Donovan et al.

(10) Patent No.: US 7,355,603 B2
(45) Date of Patent: Apr. 8, 2008

(54) FILTERING UNIT FOR FLOATING-POINT TEXTURE DATA

(75) Inventors: Walter E. Donovan, Saratoga, CA (US); Anders M. Kugler, Sunnyvale, CA (US); Christopher D. S. Donham, San Mateo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 303 days.

(21) Appl. No.: 10/912,419

(22) Filed: Aug. 4, 2004

(65) Prior Publication Data

US 2006/0028482 A1    Feb. 9, 2006

(51) Int. Cl.
*G09G 5/00* (2006.01)
(52) U.S. Cl. ............ 345/582; 345/583; 345/586; 345/589
(58) Field of Classification Search .......... 345/582, 345/583, 586, 589
See application file for complete search history.

(56) References Cited

U.S. PATENT DOCUMENTS

| 5,951,629 A | 9/1999 | Wertheim et al. |
| 6,650,327 B1 | 11/2003 | Airey et al. |
| 2005/0062762 A1* | 3/2005 | Wang et al. ............. 345/643 |

* cited by examiner

*Primary Examiner*—Matthew C. Bella
*Assistant Examiner*—Mike Rahmjoo
(74) *Attorney, Agent, or Firm*—Townsend and Townsend and Crew LLP

(57) ABSTRACT

Floating-point texture filtering units leverage existing fixed-point filter circuits. Groups of floating-point texture values are converted to products of a fixed-point mantissa and a scaling factor that is the same for each texture value in the group. The fixed-point mantissas are filtered using a fixed-point filter circuit, and the filtered mantissa is combined with the scaling factor to determine a floating-point filtered value. Multiple floating-point filter results may be combined in a floating-point accumulator circuit. The same fixed-point filter circuit may also be used to filter fixed-point texture data by providing fixed-point input path that bypasses the format conversion and a fixed-point accumulator.

22 Claims, 4 Drawing Sheets

FILTERING UNIT FOR FLOATING-POINT TEXTURE DATA

BACKGROUND OF THE INVENTION

The present invention relates in general to graphics processing devices with texture filtering, and in particular to a filtering unit for floating-point texture data.

Texture blending is a common technique for achieving various effects in computer generated images, such as realistic modeling of rough surfaces (e.g., brick or stone walls), fabric patterns, etc. Texture blending generally involves defining a texture map, most often as an array of "texels." Each texel has unique coordinates (e.g., in two or three dimensions), a color, and in some instances other attributes such as a surface normal. To apply the texture to the surface of an object (e.g., a wall or an article of clothing), fixed points on the object surface are assigned texture coordinates. After determining that a given fragment (or pixel) of the rendered image contains a particular point on the object surface, the texture coordinates are used to fetch one or more texels from the texture map, and the color and/or other attributes of the fetched texel(s) are used in shading the fragment.

Typical texture maps are defined such that the portion of the object surface contained within a given fragment covers portions of several texels. For example, the same texture is mapped at multiple levels of detail (LODs) so that, regardless of what fraction of the object surface is contained within a fragment, the number of texels to which the fragment maps can be controlled by selecting a texture map with an appropriate LOD.

Where multiple texels are covered by a fragment, the respective attributes of these texels are combined (filtered) to determine the texture attributes applicable to the fragment. For instance, FIG. 1 illustrates a conventional texture map 100 in a 2D space defined by texture coordinates (s, t). Texture map 100 includes texels 101, 102, 103, 104, which have respective values a, b, c, d for some attribute (e.g., color). A fragment 110 (dashed box) is mapped onto texture map 100 (e.g., by assigning texture coordinates to each corner of pixel 110) in such a way that it covers a portion of each of texels 101, 102, 103, 104. The texture attribute F for pixel 110 can be computed using the well known bilinear filtering formula:

$$F(a, b, c, d) = w_t * [w_s * a + (1-w_s) * b] + (1-w_t) * [w_s * c + (1-w_s) * d], \quad (\text{Eq. 1})$$

where $w_s$ and $w_t$ are weight parameters (in the range [0, 1]) that can be determined from distances in the st plane as shown in FIG. 1.

Other types of texture filters are also in common use. For instance, trilinear filtering is frequently used in conjunction with texture maps that represent the same texture at different levels of detail (LODs). The two nearest LODs for a given fragment are selected (usually based on distance from the eyepoint to the object surface being rendered), and a bilinear filter is applied at each of these two LODs to obtain two filtered values F1 and F2 in accordance with Eq. 1. The final result F is a weighted average of F1 and F2, where respective weights p and 1−p are assigned to the two LODs (e.g., based on the distance from the eyepoint to the object surface). Anisotropic texture filters are also known, in which different numbers of texels are considered in different directions in a 2D or 3D texture space. Like trilinear filters, anisotropic filters can often be implemented as weighted averages of results of multiple bilinear filtering operations.

Such filters can be computationally intensive, and graphics processors often include specialized texture filtering units that can quickly compute a filtered texture value from a set of input texture values and weights. A typical texture filtering unit includes a bilinear interpolation ("Bilerp") circuit and an accumulator circuit. The Bilerp circuit receives four texture values (a, b, c, d) and two weights ($w_s$, $w_t$) and applies a bilinear filter (e.g., Eq. 1). The accumulator circuit computes a weighted sum of the results of different passes through the Bilerp circuit using per-pass weights $w_f$, where different texture values (a, b, c, d) and weights ($w_s$, $w_t$, $w_f$) can be supplied for each pass. Thus, trilinear filtering can be implemented by instructing the accumulator circuit to accumulate results of two passes through the Bilerp circuit (with per-pass weights p and 1−p). Anisotropic filtering can involve accumulating larger numbers (e.g., up to 24) of passes with appropriate per-pass weights.

To reduce chip area and cost, texture filtering circuits are conventionally implemented using fixed-point arithmetic circuits. Fixed-point texture data, however, limits the degree of detail (e.g., subtle color variations) that can be captured in a texture map; in principle, greater realism can be achieved by using floating-point texture data. To support floating-point data, conventional texture filtering units require modification.

Replacing the fixed-point arithmetic circuits of a conventional texture filtering unit (e.g., in the Bilerp and accumulator circuits) with standard floating-point arithmetic circuits significantly increases chip area and cost. In addition, existing graphics application programs generally use fixed-point texture data, so fast filtering of fixed-point texture data also needs to be supported. Supporting fixed-point texture data would require either converting the texture data to floating-point format and converting the filter result back to fixed-point format (which would slow the processing of fixed-point texture data) or providing a separate fixed-point filtering circuit (which would further increase chip area and complexity).

It would therefore be desirable to provide an efficient texture filtering unit that is capable of processing both floating-point and fixed-point texture data.

BRIEF SUMMARY OF THE INVENTION

Embodiments of the present invention provide floating-point texture filtering units for graphics processors that leverage existing fixed-point filter circuits. Groups of floating-point texture values to be filtered are converted to products of a fixed-point mantissa and a scaling factor (e.g., block exponent) that is the same for each texture value. The fixed-point mantissas are filtered using a fixed-point filter circuit, and the filtered mantissa is combined with the scaling factor to determine a floating-point filtered value. Multiple floating-point filter results may be combined (e.g., in a weighted average) in an accumulator circuit. The same fixed-point filter circuit and accumulator circuit may also be used to filter fixed-point texture data via a fixed-point input path that bypasses the initial format conversion.

According to one aspect of the present invention, a device for filtering floating-point texture data in a graphics processor includes a prescaling circuit, a fixed-point filtering circuit, and an accumulator circuit. The prescaling circuit is configured to convert each one of a group of floating-point input texture values to a product of a fixed-point mantissa and a scaling factor, where the scaling factor is the same for each one of the group of floating-point input texture values. The fixed-point filtering circuit is configured to compute a fixed-point filter output value from a plurality of fixed-point filter input values, and the fixed-point filtering circuit is coupled to receive, as the fixed-point filter input values, the fixed-point mantissas for the group of floating-point input texture values. The accumulator circuit is coupled to receive the scaling factor from the prescaling circuit and the filter output value from the fixed-point filtering circuit and is configured to scale the filter output value by a reciprocal of the scaling factor, thereby generating a floating-point filter result. In some embodiments, the accumulator circuit may also be configured to accumulate a weighted sum of a number of floating-point filter results, each of which may be obtained by processing a group of texture values through the prescaling circuit and the fixed-point filtering circuit.

In some embodiments, the device also includes a fixed-point input path. The fixed-point input path is configured to provide a group of fixed-point input texture values as the filter inputs to the fixed-point filtering circuit, and the fixed-point input path being coupled to the fixed-point filtering circuit via a fixed-point input path that bypasses the prescaling circuit. In this embodiment, the device is configurable for operation using either fixed-point texture values or floating-point texture values as inputs. The accumulator circuit may be configured to be operable in either of a fixed-point mode and a floating-point mode; for instance, in the fixed point mode, the accumulator may operate with the scaling factor equal to 1.

According to another aspect of the present invention, a graphics processor has a shader module for computing a fragment color. The shader module includes a texture fetch unit and a texture filter unit. The texture fetch unit is configured to fetch a number of texture values corresponding to a fragment and to determine whether the fetched texture values are in a fixed-point format or a floating-point format. The texture filter unit is coupled to receive the fetched texture values from the texture fetch unit and is configured to apply a filter to the fetched texture values, thereby generating a filter result. The texture filter unit is operable in either of a fixed-point mode and a floating-point mode, and it operates in the fixed-point mode in the event that the fetched texture values are in the fixed-point format and in the floating-point mode in the event that the fetched texture vales are in the floating-point format.

According to still another aspect of the present invention, a method for filtering texture data in a graphics processor is provided. A group of floating-point texture values is received. A scaling factor is determined for the group of received texture values. Each of the received texture values is scaled by the scaling factor, and each of the scaled texture values is converted to a fixed-point format. The converted texture values are provided as filter inputs to a fixed-point texture filtering circuit configured to compute a fixed-point filter output from a plurality of filtered inputs, and a filter output in a fixed-point format is received from the texture filtering circuit. The filter output value is scaled by a reciprocal of the scaling factor, thereby generating a floating-point filter result. In some embodiments, a weighted sum of a plurality of floating-point filter results, each obtained by the same steps, may be accumulated. In other embodiments, a group of fixed-point texture values may also be received and provided as filter inputs to the fixed-point texture filtering circuit. A filter output in a fixed-point format is then received from the texture filtering circuit. A weighted sum of fixed-point filter outputs, each obtained by these steps may also be accumulated.

The following detailed description together with the accompanying drawings will provide a better understanding of the nature and advantages of the present invention.

DETAILED DESCRIPTION OF THE INVENTION

Embodiments of the present invention provide floating-point texture filtering units for graphics processors that leverage existing fixed-point filter circuits. Groups of floating-point texture values to be filtered are converted to products of a fixed-point mantissa and a scaling factor (e.g., block exponent) that is the same for each texture value. The fixed-point mantissas are filtered using a fixed-point filter circuit, and the filtered mantissa is combined with the scaling factor to determine a floating-point filtered value. Multiple floating-point filter results may be combined (e.g., in a weighted average) in a floating-point accumulator circuit. The same fixed-point filter circuit may also be used to filter fixed-point texture data via a fixed-point input path that bypasses the format conversion and a fixed-point accumulator.

Figure 1:
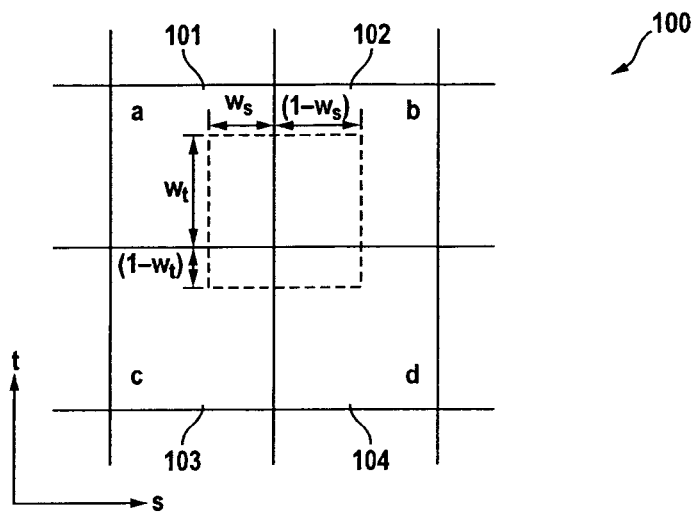
FIG. 1 illustrates a conventional texture map in a 2D texture coordinate space.
Figure 2:
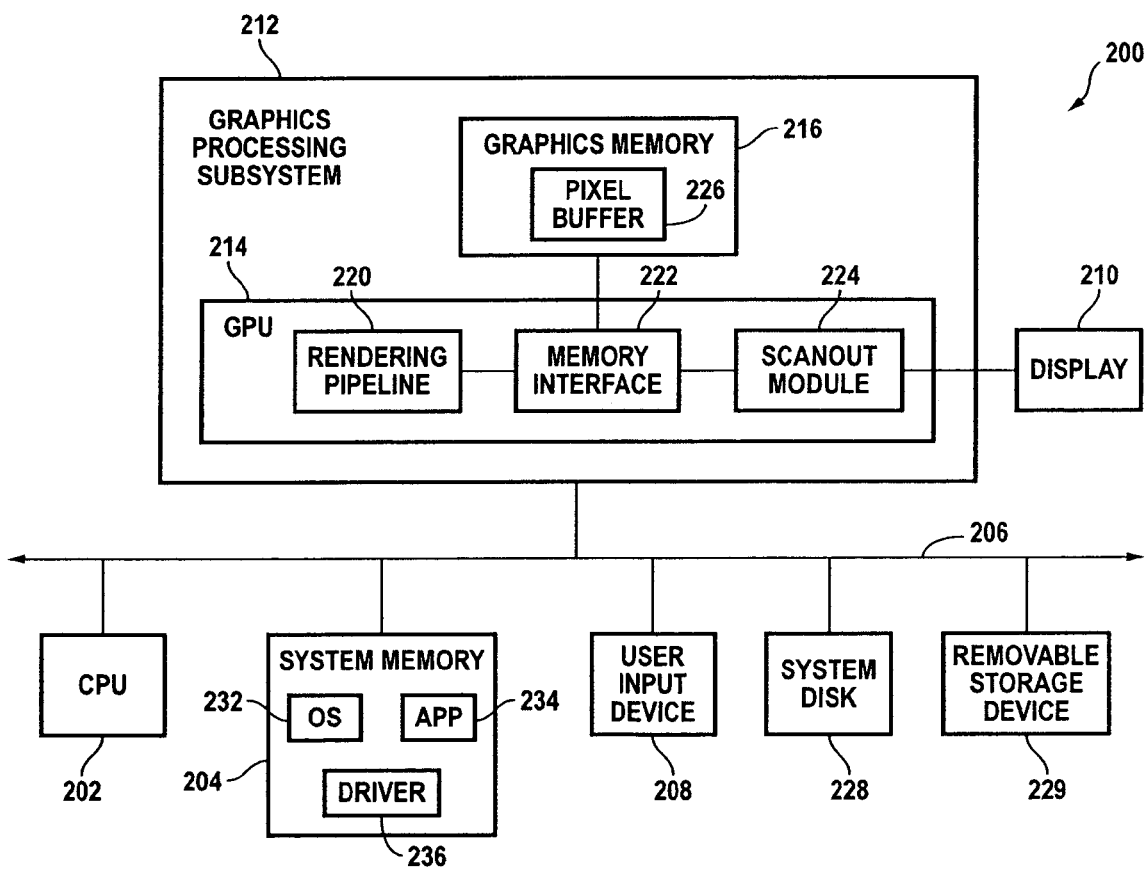
FIG. 2 is a simplified block diagram of a computer system according to an embodiment of the present invention.

Graphics processors incorporating embodiments of the present invention can be included in a variety of computer systems. FIG. 2 is a simplified block diagram of a computer system 200 according to an embodiment of the present invention. Computer system 200 includes a central processing unit (CPU) 202 and a system memory 204 communicating via a bus 206. User input is received from one or more user input devices 208 (e.g., keyboard, mouse) coupled to bus 206. Visual output is provided on a pixel-based display device 210 (e.g., a conventional CRT or LCD based monitor) operating under control of a graphics processing subsystem 212 coupled to system bus 206. A system disk 228 and other components, such as one or more removable storage devices 229 (e.g., floppy disk drive, compact disk (CD) drive, and/or DVD drive), may also be coupled to system bus 206. System bus 206 may be implemented using one or more of various bus protocols including PCI (Peripheral Component Interconnect), AGP (Advanced Graphics Processing) and/or PCI Express (PCI-E); appropriate "bridge" chips such as a north bridge and south bridge (not shown) may be provided to interconnect various components and/or buses.

Graphics processing subsystem 212 includes a graphics processing unit (GPU) 214 and a graphics memory 216, which may be implemented, e.g., using one or more integrated circuit devices such as programmable processors, application specific integrated circuits (ASICs), and memory devices. GPU 214 includes a rendering pipeline 220, a memory interface module 222, and a scanout module 224. Rendering pipeline 220 may be configured to perform various tasks related to generating pixel data from graphics data supplied via system bus 206 (e.g., implementing various 2D and/or 3D rendering algorithms), interacting with graphics memory 216 to store and update pixel data, and the like. Rendering pipeline 220 is advantageously configured to generate pixel data from 2D or 3D scene data provided by various programs executing on CPU 202. One embodiment of rendering pipeline 220 is described further below.

Memory interface module 222, which communicates with rendering pipeline 220 and scanout control logic 224, manages all interactions with graphics memory 216. Memory interface module 222 may also include pathways for writing pixel data received from system bus 206 to graphics memory 216 without processing by rendering pipeline 220. The particular configuration of memory interface module 222 may be varied as desired, and a detailed description is omitted as not being critical to understanding the present invention.

Graphics memory 216, which may be implemented using one or more integrated circuit memory devices of generally conventional design, may contain various physical or logical subdivisions, such as a pixel buffer 226. Pixel buffer 226 stores pixel data for an image (or for a part of an image) that is read and processed by scanout module 224 and transmitted to display device 210 for display. This pixel data may be generated, e.g., from 2D or 3D scene data provided to rendering pipeline 220 of GPU 214 via system bus 206, or it may be generated by various processes executing on CPU 202 and provided to pixel buffer 226 via system bus 206. In some embodiments, pixel buffer 226 can be double buffered so that while data for a first image is being read for display from a "front" buffer, data for a second image can be written to a "back" buffer without affecting the currently displayed image. Other portions of graphics memory 216 may be used to store data required by GPU 214 (such as texture data, color lookup tables, etc.), executable program code for GPU 214 and so on.

Scanout module 224, which may be integrated in a single chip with GPU 214 or implemented in a separate chip, reads pixel color data from pixel buffer 226 and transfers the data to display device 210 to be displayed. In one embodiment, scanout module 224 operates isochronously, scanning out frames of pixel data at a prescribed screen refresh rate (e.g., 80 Hz) regardless of any other activity that may be occurring in GPU 214 or elsewhere in system 200. In some embodiments, the screen refresh rate can be a user selectable parameter, and the scanout order may be varied as appropriate to the display format (e.g., interlaced or progressive scan). Scanout module 224 may also perform other operations, such as adjusting color values for particular display hardware and/or generating composite screen images by combining the pixel data from pixel buffer 226 with data for a video or cursor overlay image or the like, which may be obtained, e.g., from graphics memory 216, system memory 204, or another data source (not shown). In some embodiments, scanout module 224 may also rescale images (e.g., enlarging or reducing), e.g., by interpolating pixel data from pixel buffer 226.

During operation of system 200, CPU 202 executes various programs that are (temporarily) resident in system memory 204. In one embodiment, these programs include one or more operating system (OS) programs 232, one or more application programs 234, and one or more driver programs 236 for graphics processing subsystem 212. It is to be understood that, although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on chip instruction cache and/or various buffers and registers), in a page file or memory mapped file on system disk 228, and/or in other storage space.

Operating system programs 232 and/or application programs 234 may be of conventional design. An application program 234 may be, for instance, a video game program that generates graphics data and invokes appropriate rendering functions of GPU 214 (e.g., rendering pipeline 220) to transform the graphics data to pixel data. Another application program 234 may generate pixel data and provide the pixel data to graphics processing subsystem 212 for display. It is to be understood that any number of application programs that generate pixel and/or graphics data may be executing concurrently on CPU 202. Operating system programs 232 (e.g., the Graphical Device Interface (GDI) component of the Microsoft Windows operating system) may also generate pixel and/or graphics data to be processed by graphics processing subsystem 212.

Driver program 236 enables communication with graphics processing subsystem 212, including both rendering pipeline 220 and scanout module 224. Driver program 236 advantageously implements one or more standard application program interfaces (APIs), such as Open GL, Microsoft DirectX, or D3D, for communication with graphics processing subsystem 212; any number or combination of APIs may be supported, and in some embodiments separate driver programs 236 are provided to implement different APIs. By invoking appropriate API function calls, operating system programs 232 and/or application programs 234 are able to instruct driver program 236 to transfer geometry data or pixel data to graphics processing subsystem 212 via system bus 206, to control operations of rendering pipeline 220, to modify state parameters for scanout module 224 and so on. The specific commands and/or data transmitted to graphics processing subsystem 212 by driver program 236 in response to an API function call may vary depending on the implementation of GPU 214, and driver program 236 may also transmit commands and/or data implementing additional functionality (e.g., special visual effects) not controlled by operating system programs 232 or application programs 234. Various techniques for managing communication between driver program 236 and graphics processing subsystem 212 are known in the art and may be used, including asynchronous techniques.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, the GPU may be incorporated into a variety of devices, including general purpose computer systems, video game consoles and other special purpose computer systems, DVD players, and the like.

Figure 3:
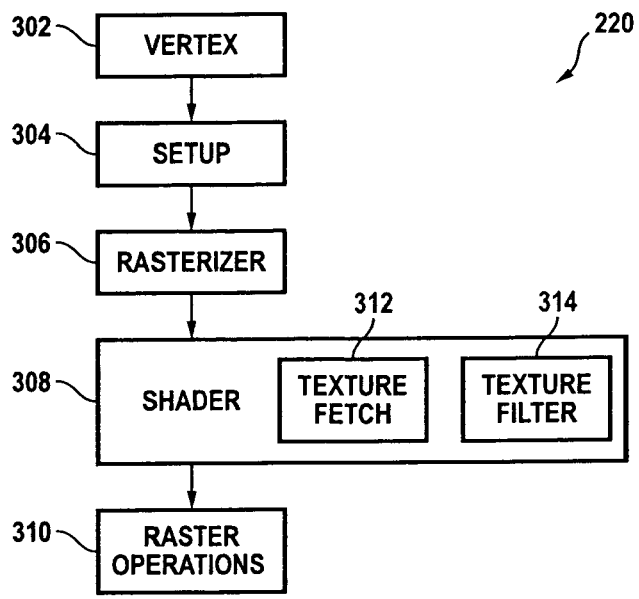
FIG. 3 is a simplified block diagram of a rendering pipeline according to an embodiment of the present invention.

FIG. 3 is a simplified block diagram of a rendering pipeline 220 according to an embodiment of the present invention. In this embodiment, rendering pipeline 220 includes a geometry module 302, a setup module 304, a rasterizer 306, a shader 308, and a raster operations module 310. Geometry module 302, which may be of generally conventional design, receives data describing a 3D scene to be rendered. In one embodiment, the scene data includes data defining a number of objects (e.g., a table, a chair, a person or animal) that may be present in the scene. Each object is advantageously represented as a primitive (e.g., a triangle, a line) or a group of primitives for which vertex locations are specified in an object coordinate system. In addition to a location, each vertex also has various attributes associated with it. In general, attributes of a vertex may include any property that is specified on a per-vertex basis. In one embodiment, attributes include red, green, and blue color components; a transparency parameter; and texture coordinates relating the vertex location to a texture map.

Since each object may have its own coordinate system, additional data or commands are advantageously provided to position the objects relative to each other, e.g., by specifying a transformation matrix for each object from object coordinates to a common "world" coordinate system. The transformation matrix for an object is applied to each of its vertices. World coordinates may be further transformed to viewing coordinates with an origin at an eyepoint and a z (depth) axis defined by a view direction, and viewing coordinates may be further transformed to a screen space where the (x, y) coordinates correspond to a pixel (or fragment) array. Geometry module 302 may also perform other functions such as culling invisible geometry, clipping geometry that is partly invisible, and the like. Numerous examples of vertex operations are known in the art and may be implemented in geometry module 302.

Geometry module 302 provides the transformed primitives to setup module 304. For each primitive it receives, setup module 304 computes edge equations for use by rasterizer 306 and provides vertices for use in computing attribute values for any fragments covered by the primitive.

Rasterizer 306 performs scan conversion on the received primitives (e.g., using the edge equations). Scan conversion generally involves defining an array of fragments (e.g., pixels) corresponding to screen locations, determining which primitive(s) is (are) visible for each fragment, and providing the ordered vertex list for that primitive to shader 308 for use in determining the color of the fragment. Rasterizer 306 may implement conventional scan conversion algorithms for determining visibility and may be configurable to allow an application programmer to select among different algorithms. It is to be understood that the fragments defined for rasterizer 306 need not correspond to a pixel array of a particular display device. For example, in order to support various antialiasing algorithms known in the art, it may be desirable for rasterizer 306 to sample the image at a higher resolution than is supported by a given display device.

Shader 308 uses vertex information for each fragment provided by rasterizer 306 to determine a color (and, in some embodiments, other attributes such as depth) for the fragment. Various techniques for determining color (or other attributes) can be used, examples of which are known in the art. In some embodiments, shader 308 is implemented as a programmable shader that receives a program (some sequence of operations) to be used for processing fragments and executes the program for each fragment. The shader program may include instructions for a variety of fragment processing operations, including texture blending. Texture blending programs generally include instructions for selecting a texture to apply to a fragment, selecting among various texture filtering algorithms (e.g., bilinear, trilinear, or anisotropic filtering), and computing filtering weights.

Shader 308 advantageously includes a texture fetch unit 312 and a texture filter unit 314 for executing texture blending instructions. Texture fetch unit 312, which may be of generally conventional design, is advantageously configured to fetch either fixed-point or floating-point texture data for a fragment. A texture map may be stored in local or remote memory in fixed-point or floating-point format. During fragment processing by shader 308, texture fetch unit 312 determines the texture coordinates for a fragment and fetches one or more corresponding texels from the in-memory texture map. Texture fetch unit 312 may also assign weights to each texel using conventional techniques.

Texture fetch unit 312 advantageously also determines whether the texture map is stored in fixed-point or floating-point format. In one embodiment, a format flag (or other suitable data structure) is stored in memory in association with the texture map, and texture fetch unit 312 may read the format flag together with the texels. Alternatively, different areas of memory may be reserved for floating-point and fixed-point texture maps, and texture fetch unit 312 may determine the numerical format for a given texture map based on a memory address for the texel or map. Other techniques for distinguishing floating-point and fixed-point texture maps may also be implemented.

In accordance with an embodiment of the present invention, texture filtering unit 314 applies a suitable filter to the retrieved texels. In one embodiment, texture filtering unit 314 receives texture values and weights from texture fetch unit 312 and includes arithmetic circuitry for performing a filtering operation on the received values. Texture filtering unit 314 is advantageously configured to operate on both floating-point and fixed-point textures, and texture fetch unit 312 advantageously provides the format flag (or another format indicator) to texture filtering unit 314. After filtering, texture filtering unit 314 returns a result to shader 308 for further processing, e.g., blending with an underlying fragment color or surface normal.

In addition to texture blending, shader 308 may also apply other effects, including various lighting and/or fog effects known in the art, to compute a final fragment color, and shader 308 may include components (not shown) related to such computations. Ultimately, shader 308 produces a color value (e.g., in RGBα format) for each fragment. These color values may be stored, e.g., in graphics memory 216 or elsewhere.

Raster operations module 310 performs various operations on the array of fragment color values generated by shader 308. For example, where rasterizer 306 generates an oversampled fragment array, raster operations module 310 may downfilter the fragment data to match the pixel resolution of a display device. The final pixel color values generated by raster operations module 310 are stored in pixel buffer 226 for subsequent scanout by scanout module 224.

It will be appreciated that the rendering pipeline described herein is illustrative and that variations and modifications are possible. The division of rendering functions among various functional blocks described herein is made for purposes of description, and it is to be understood that different divisions (e.g., division into more or fewer functional blocks) might be made and that different components of the pipeline may share some circuitry. The rendering pipeline is advantageously implemented such that different components can operate concurrently on different data. In addition, each module within the rendering pipeline may also operate in pipelined fashion. A rendering pipeline may include multiple instances of any or all of the modules described herein (e.g., multiple shader modules that operate on different fragments in parallel), thereby boosting overall rendering speed. Additionally, multiple instances of the entire rendering pipeline might be implemented in a single graphics processor.

A texture filtering unit according to an embodiment of the present invention will now be described. For purposes of illustration, particular fixed-point and floating-point formats for binary encoding of real numbers are used herein. Fixed-point formats are identified herein by the notation (sM.N) or (uM.N), where "s" indicates a signed format, "u" indicates an unsigned format, M is the number of bits before the decimal point, and N is the number of bits after the decimal point. For instance, (s2.14) uses a total of 16 bits to encode numbers in the range (−4, 4). In one embodiment, the texture filtering unit uses an internal unsigned format with a positive bias; for example (u2.14) can be used to represent the same range as (s2.14) if numbers are biased upward by adding 4.0 (represented as a bit field 0×8000) to the 16-bit field; such biasing is known in the art.

Floating-point formats used herein include a mantissa having some number of bits (which may include a sign bit) and an exponent having some number of bits (generally fewer bits than the mantissa, although this is not required). The value V of a floating-point number is its mantissa (m) multiplied by 2 raised to the power of the exponent (x); i.e., $V=m*2^x$. The mantissa may be expressed in any convenient fixed-point format and is not constrained to being in any particular format or range. For example, a block floating-point format used herein has a mantissa in (s2.14) or (s2.22) format and a 5-bit exponent. As another example, "fp16" format, as used herein, is a 16-bit floating-point format based on IEEE 754 encoding standards. In fp16 format, a number is represented by a sign bit, five exponent bits, and ten mantissa bits. The five exponent bits are biased by +15, and the ten mantissa bits represent the fractional portion of the mantissa, with an implicit "1" preceding the decimal point. Certain values (based on the IEEE 754 standard) are reserved to indicate special numbers including underflows ("Denorms"), zero, positive and negative infinity (INF), and undefined ("not a number," or NaN) values. It is to be understood that other formats may be substituted for any of the specific formats used as examples herein.

Figure 4:
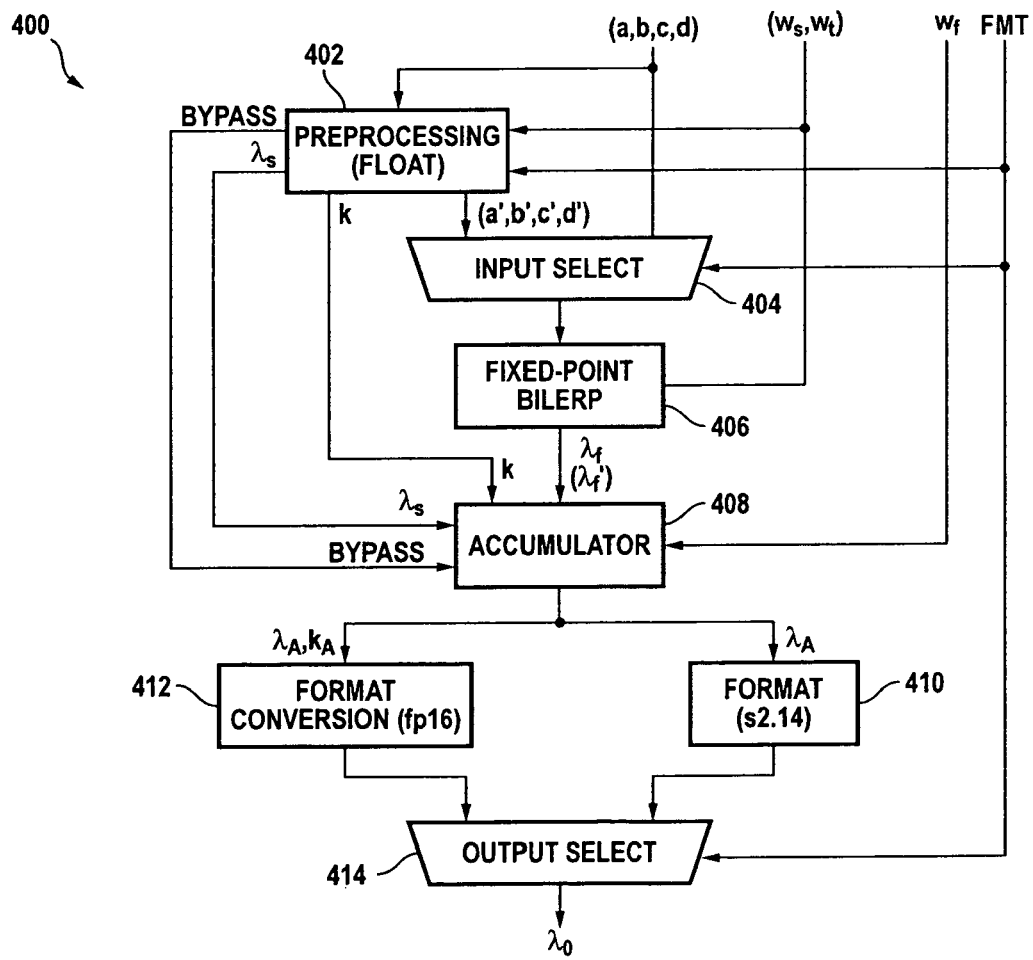
FIG. 4 is a simplified block diagram of a texture filtering unit according to an embodiment of the present invention.

FIG. 4 is a simplified block diagram of a texture filtering unit 400 according to an embodiment of the present invention. Texture filtering unit 400 provides a floating-point wrapper around a conventional fixed-point bilinear interpolation circuit and is configurable for filtering either fixed-point or floating-point texture data. Texture filtering unit 400 includes a floating-point preprocessing block 402, an input selection circuit 404, a fixed-point bilinear interpolation (Bilerp) circuit 406, an accumulator circuit 408 that performs both fixed-point and floating-point accumulation, a fixed-point (s2.14) formatting circuit 410, a floating-point (fp16) format conversion circuit 412, and an output selection circuit 414.

Texture filtering unit 400 advantageously communicates with other components (not shown) that supply input data including texture values (a, b, c, d) for a fragment and weights ($w_s$, $w_t$, $w_f$) to be used during filtering. The input data advantageously also include a format signal (FMT) indicating whether the texture values are in a fixed-point or floating-point format. In one embodiment, texture filtering unit 400 implements texture filter unit 314 of shader 308 (FIG. 3) and receives input data from texture fetch unit 312 and/or other control circuitry (not shown) in shader 308. Examples of suitable control circuits are known in the art, and a detailed description is omitted as not being critical to understanding the present invention.

Fixed-point texture filtering is provided by fixed-point Bilerp circuit 406, which may be of generally conventional design, and accumulator circuit 408, which advantageously handles both fixed point and floating point formats as described below. In one embodiment, fixed-point Bilerp circuit 406 receives as inputs four fixed-point texture values (a, b, c, d) and two weights ($w_s$, $w_t$). These inputs are used to implement a conventional bilinear filter (e.g., Eq. 1) that produces a filtered value $\lambda_f$.

More complex filters, such as trilinear filters or anisotropic filters, can be implemented by passing multiple groups of texture values and associated weights to Bilerp circuit 406 and accumulating a weighted average of the results $\lambda_f$ from each pass in accumulator circuit 408. Accumulator circuit 408 is advantageously configured to multiply each received filter result $\lambda_f$ by a corresponding weight $w_f$ and add the product to a running total ($\lambda_A$). Where the desired filter entails just one bilinear filtering pass, accumulator circuit 408 can be instructed to accumulate one result $\lambda_f$ with a weight $w_f=1$. For more complex filters, such as trilinear or anisotropic filtering, any number of bilinear filtering passes may be accumulated with weights $w_f$ determined in accordance with the particular filtering algorithm. The number of passes to be accumulated and a weight $w_f$ for each pass may be provided as input parameters to accumulator circuit 408 (e.g., by control circuits of shader 308 as mentioned above); when the specified number of passes has been reached, accumulator circuit 408 provides its output $\lambda_A$ to fixed-point formatting circuit 410.

Bilerp circuit 406 and accumulator circuit 408 may support any desired fixed-point format, such as (s2.14). In one embodiment, Bilerp circuit 406 receives (s2.14) texture values, biases each value upward by 32K (effectively converting the values to an unsigned representation), applies the bilinear filter, and biases the result downward by 4.0 to determine $\lambda_f$. The weights $w_s$, $w_t$, and $w_f$ may be in a different format, e.g., (u1.9) for weights in the range [0, 1]. In some embodiments, accumulator circuit 408 advantageously preserves a larger number of bits than Bilerp circuit 406 in order to reduce or eliminate rounding errors that can occur when filter results are multiplied by weights less than 1. For example, fixed-point filter circuit 406 may use (s2.14) format while accumulator circuit 408 uses (s2.22). Fixed-point formatting circuit 410 is provided to convert the internal format of accumulator circuit 408 to the final fixed-point format in the event that different formats are used; for instance, conversion from (s2.22) to (s2.14) can be performed by simply dropping LSBs or by rounding.

Floating-point texture filtering is provided by fixed-point Bilerp circuit 406 in cooperation with preprocessing block 402, accumulator circuit 408, and floating-point format conversion circuit 412. This embodiment exploits the linearity of the filtering algorithm to implement floating-point filtering using fixed-point arithmetic circuits. In general, as is known in the art, a linear filter F(a, b, c, d), such as the bilinear filter of Eq. 1, has the property that for any nonzero scalar q:

$$F(qa, qb, qc, qd)=q*F(a, b, c, d). \quad (Eq. 2)$$

Preprocessing block 402 of texture filter 400 prescales the input floating-point texture values (a, b, c, d) by a factor $q=2^{-k}$, where the block exponent k is selected based on respective exponent fields of the floating-point values (a, b, c, d). With an appropriate selection of block exponent k, the prescaled floating-point values:

$$a'=a*2^{-k}, b'=b*2^{-k}, c'=c*2^{-k}, d'=d*2^{-k} \quad (Eq. 3)$$

are in a suitable range for conversion to a fixed-point format, e.g., (s2.14).

The prescaled texture values (a', b', c', d') are provided (in the fixed-point format) to fixed-point Bilerp circuit 406, which generates a filtered mantissa value:

$$\lambda_f'=F(a', b', c', d')=2^{-k}*F(a, b, c, d), \quad (Eq. 4)$$

where the right-hand equality holds as long as Bilerp circuit 406 implements a linear filter.

For floating-point filtering, accumulator circuit 408 receives the prescale factor (block exponent k) in addition to the filtered mantissa value $\lambda_f'$ and obtains the desired floating-point result:

$$\lambda_f=F(a, b, c, d)=\lambda_f'*2^k. \quad (Eq. 5)$$

As noted above, accumulator circuit 408 is advantageously configurable to accumulate Bilerp results $\lambda_f'$ and block exponents k over multiple passes, with each result being weighted by a respective weight $w_f'$, any filtering algorithm that can be performed for fixed-point texture data can also be performed for floating-point texture data.

When accumulation is complete, accumulator circuit 408 provides the accumulated results (a mantissa $\lambda_A$ and a block exponent $k_A$) to format conversion circuit 412. Format conversion circuit 412 converts the floating-point number represented by mantissa $\lambda_A$ and block exponent $k_A$ to a standard floating-point format (e.g., fp16).

Texture filtering unit 400 is advantageously configurable so that fixed-point or floating-point filtering can be dynamically selected. To support dynamic format selection, input selection circuit 404 and output selection circuit 414 are provided. Selection circuits 404, 414 are controlled by a format selection (FMT) signal that indicates whether the input texture data is in fixed-point format or floating-point format. These circuits may be implemented, e.g., using conventional multiplexers.

In operation, texture data values (a, b, c, d) are provided to texture filtering unit 400 in either fixed-point or floating-point format. These texture data values may correspond to any attribute of a texture for which filtering is desired, including color (or individual color components), surface normal, or any other attribute. The format signal FMT, which may be generated, e.g., by a texture fetch unit as described above, is also provided in an appropriate state to indicate whether the texture data is in fixed-point or floating-point format. For fixed-point data, input selection circuit 404 provides the fixed-point values (a, b, c, d) directly to Bilerp circuit 406, ignoring the output of preprocessing block 402, and output selection circuit 414 selects the output of the fixed-point data path (provided by fixed-point formatting circuit 410) as the final output $\lambda_O$, ignoring the output of the floating-point data path (provided by format conversion circuit 412). For floating-point data, input selection circuit 404 selects the prescaled outputs (a', b', c', d') as fixed-point inputs to Bilerp circuit 406, and output selection circuit 414 selects the output of the floating-point data path as the final output $\lambda_O$, ignoring the output of the fixed-point data path.

In some embodiments, format signal FMT may also be used to disable components of filter 400 that are not active at a given time. For instance, fixed-point formatting circuit 410 may be disabled when the input data is floating-point; for fixed-point data, preprocessing block 402 and floating-point format conversion circuit 412 may be disabled. In some embodiments, for fixed-point input data, the block exponent k provided by preprocessing block 402 may be set to zero or another convenient value.

Figure 5:
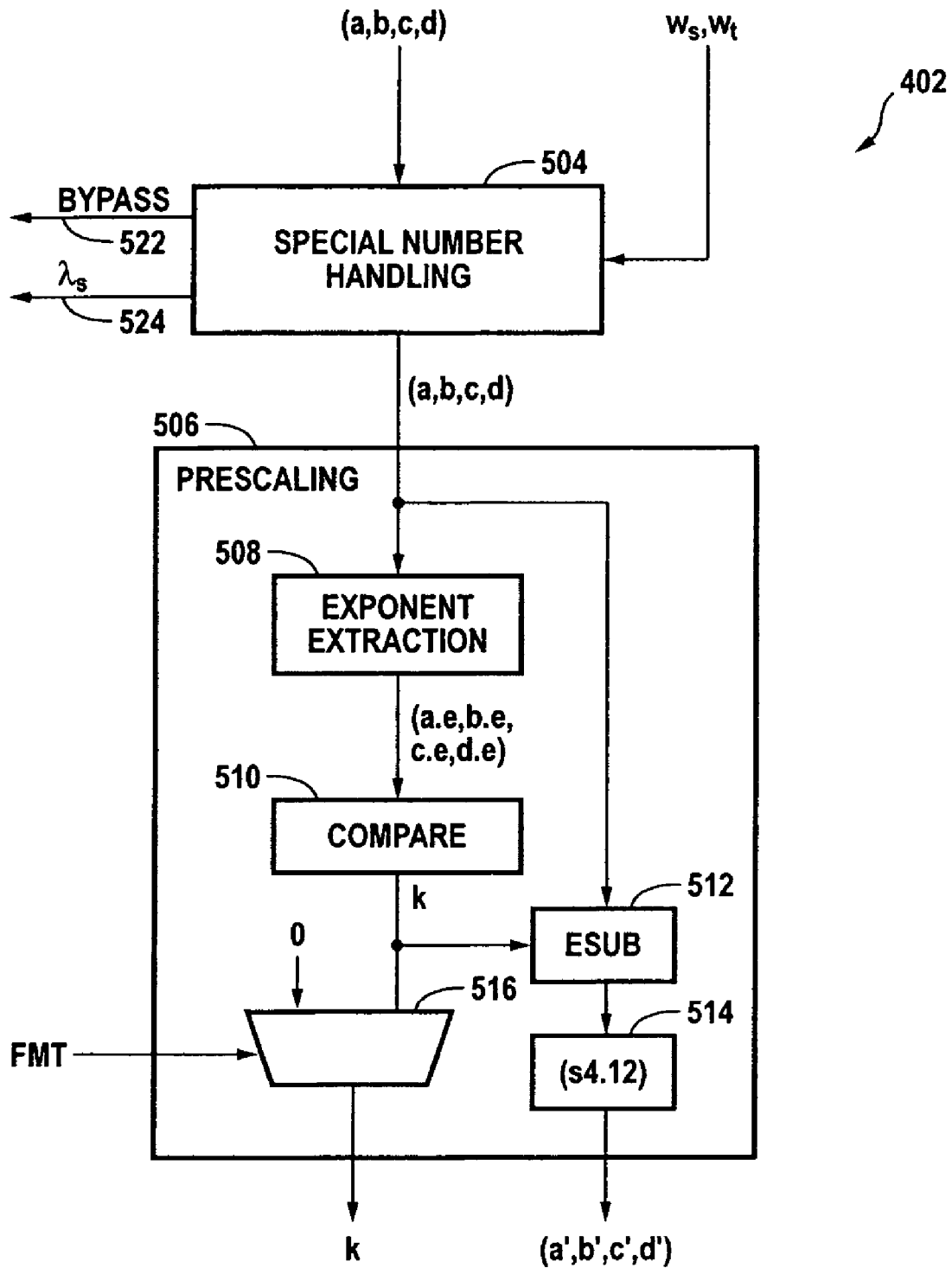
FIG. 5 is a block diagram of an implementation of a preprocessing block according to an embodiment of the present invention.

Specific implementations of the floating-point circuits of texture filtering unit 400 will now be described. FIG. 5 is a block diagram of an implementation of preprocessing block 402 according to an embodiment of the present invention. Preprocessing block 402 converts floating-point texture values (a, b, c, d) in fp16 format to fixed-point values (a', b', c', d') in (s2.14) format by prescaling the inputs using a block exponent k. Preprocessing block 402 includes a special number circuit 504 and a prescaling block 506.

Special number circuit 504 receives the floating-point texture values (a, b, c, d) and the associated weights ($w_s$, $w_t$); detects any special numbers (e.g., INF, NaN); and where appropriate, generates a special number output $\lambda_S$ on signal path 522 and a bypass signal on signal path 524 that are used in subsequent circuits to cause the special number output $\lambda_S$ to override the result of Bilerp circuit 406. As described below, these signals facilitate emulation of the special-number arithmetic of a floating-point texture filter.

In one embodiment, the following rules for handling fp16 special numbers are implemented: First, any NaN or INF texture value that is to be multiplied by a zero weight is replaced with a zero and processed in the normal manner. Second, if a NaN texture value is to be multiplied by a nonzero weight, the special number output $\lambda_S$ is set to a canonical NaN and the bypass signal is asserted. Fourth, if +INF and −INF are to be added together, the special number output $\lambda_S$ is set to NaN and the bypass signal is asserted. Third, if a positive (negative) INF texture value is to be multiplied by a nonzero weight, the special number output $\lambda_S$ is set to positive (negative) INF and the bypass signal is asserted. In all other cases, the texture values are passed through unaltered and the bypass signal is deasserted; $\lambda_S$ may be set to any convenient value (e.g., zero). As will be seen below, these special number rules result in correct modeling of a floating-point bilinear filter. It will be appreciated that conventional logic circuitry for detecting special numbers may be used to implement these rules and that different rules for handling special numbers might also be implemented.

Prescaling block 506, which determines the block exponent k, includes an exponent extraction circuit 508, a four-way comparison circuit 510, an exponent subtraction (ESUB) circuit 512, and an (s2.14) format conversion circuit 514. Exponent extraction circuit 508 extracts the exponent bits from each of inputs (a, b, c, d) and provides the exponents (denoted by a.e, b.e, c.e, d.e) to four-way comparison circuit 510. Four-way comparison circuit 510 selects the largest of the four exponents as block exponent k. In one embodiment, four-way comparison circuit 510 may perform two-way comparisons between pairs of inputs (a.e, b.e) and (c.e, d.e) to select the larger of each pair, then perform a two-way comparison on the results of the first two comparisons; any conventional comparison circuitry may be used.

To prescale the inputs (a, b, c, d) by $2^{-k}$, ESUB circuit 512 subtracts the value k from the exponent portion of each input, resulting in prescaled inputs (a', b', c', d'). ESUB circuit 512 is advantageously configured to handle any exponent underflows correctly (e.g., by right-shifting mantissa bits or flushing inputs to zero as appropriate). Where the largest of the four exponents is chosen as block exponent k, the largest prescaled input (a', b', c', d') has an absolute value in the range [1, 2), while the other prescaled inputs have absolute values in the range [0, 2).

Format conversion circuit 514 converts the prescaled fp16 values to a fixed-point (s2.14) representation. Since the prescaled values have absolute values less than 2, the fixed-point representation does not overflow; any underflows are flushed to zero. Conventional format conversion circuits and techniques may be used to implement format conversion circuit 514, and circuit 514 may convert the numbers to any format that is appropriate for inputs to Bilerp circuit 406.

The prescaling factor (exponent k) is provided to accumulator circuit 408. In the event that the inputs are in fixed-point format, selection circuit 516, which may be, e.g., a conventional multiplexer controlled by the format selection signal FMT, can be used to set block exponent k to zero, thereby establishing a scaling factor of 1 for all fixed-point inputs.

It will be appreciated that the preprocessing circuit described herein is illustrative and that variations and modifications are possible. For example, rather than selecting the largest exponent as the block exponent for prescaling, a different number might be chosen. For a given embodiment, an optimal choice of block exponent may depend in part on the particular fixed-point format used by Bilerp circuit 406.

Referring again to FIG. 4, for floating-point texture inputs, the prescaled texture values (a', b', c', d') from preprocessing circuit 402 are provided to fixed-point Bilerp circuit 406 by input selection circuit 404 as described above. Bilerp circuit 406 applies a bilinear filter and provides the (fixed-point) result $\lambda_f'$ to accumulator circuit 408. It should be noted that the operation of Bilerp circuit 406 is advantageously independent of whether the inputs were received via the fixed-point or floating-point input path; thus conventional fixed-point Bilerp circuits may be used without modification.

Figure 6:
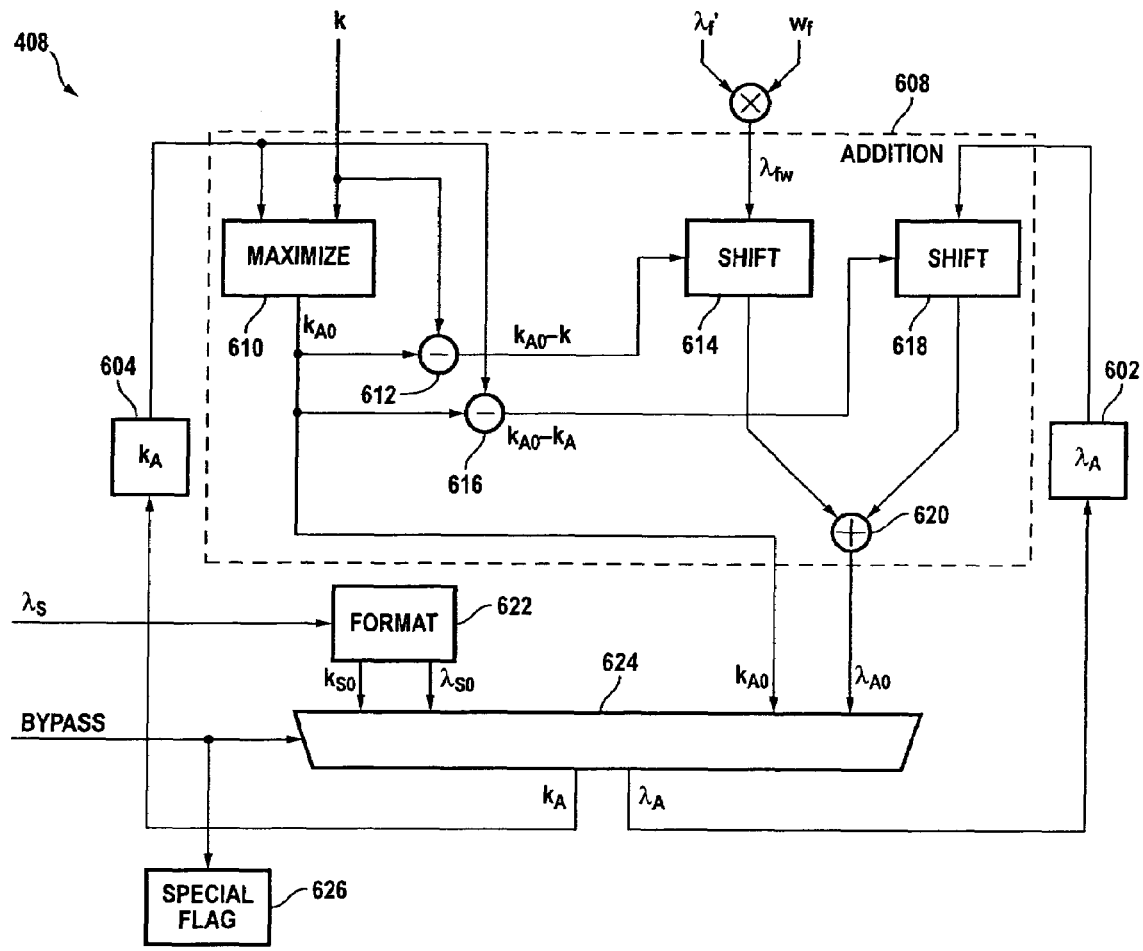
FIG. 6 is a simplified block diagram of a floating-point accumulator circuit according to an embodiment of the present invention.

FIG. 6 is a simplified block diagram of accumulator circuit 408 according to an embodiment of the present invention. As described above, accumulator circuit 408 is provided with weights $w_f$ for computing a weighted sum of results of multiple passes through Bilerp circuit 406. In the case of floating-point data, accumulator circuit 408 reintroduces the block exponent k associated with each pass. (Because prescale block 506 described above advantageously selects the block exponent k independently for each pass, k will generally be different for different passes.)

In addition, accumulator circuit 408 advantageously implements rules for handling cases where the floating-point input texture data includes a special number (e.g., NaN or INF) in a manner that emulates the behavior of a floating-point bilinear filter circuit. For instance, in an fp16 floating-point filter, it would be expected that if one of the input texture values is NaN (or INF), the result should also be NaN (or INF). Such behavior can be implemented by using the special value $\lambda_S$ (lines 522) and the bypass signal (line 524) provided by special number circuit 504 (FIG. 5) to override the results of Bilerp circuit 406.

Floating-point accumulation in the normal case (i.e., where the bypass signal is not asserted) will be described first. As shown in FIG. 6, accumulator circuit 408 includes a register 602 for storing an accumulated mantissa value $\lambda_A$ and a register 604 for storing an accumulated block exponent $k_A$. Accumulated mantissa $\lambda_A$ is advantageously stored in a fixed-point (s2.22) format, and block exponent $k_A$ is stored as an integer (e.g., an unsigned 5 bit integer with a +15 bias to cover the full range of possible fp16 exponents). Registers 602 and 604 are updated as results of each filter pass are received and are read out to output stage 412 when accumulation is complete.

Accumulator circuit 408 receives as inputs the current filter result $\lambda_f'$, a weighting factor $w_f$ to be applied to the current result, and the current block exponent k. Multiplier 606 multiplies $\lambda_f'$ by $w_f$, providing the result as a current mantissa $\lambda_{fw}$. A floating-point addition module 608 interprets the current mantissa $\lambda_{fw}$ and block exponent k as a block floating-point result $\lambda_{fw}*2^k$ and adds this result to an accumulated block floating-point result $\lambda_A*2^{k_A}$. Specifically, floating-point addition module 608 determines which of current block exponent k and accumulated block exponent $k_A$ is larger, shifts one of the mantissas $\lambda_A$ and $\lambda_{fw}$ so that both floating-point values are represented using the larger block exponent, then adds the mantissas, storing the sum as $\lambda_A$ in register 602 and the larger block exponent as $k_A$ in register 604.

More specifically, floating-point addition module 608 includes a maximizer circuit 610 that selects the larger of k and $k_A$ as a new accumulated block exponent ($k_{A0}$). A subtraction circuit 612 subtracts k from $k_{A0}$, and a bit-shift circuit 614 right-shifts current mantissa $\lambda_{fw}$ by ($k_{A0}$–k) bits. Similarly, a subtraction circuit 616 subtracts $k_A$ from $k_{A0}$, and a bit-shift circuit 618 right-shifts accumulated mantissa $\lambda_A$ by ($k_{A0}$–$k_A$) bits. (In general, the operation of circuits 610, 612, 614, 616, and 618 results in one mantissa being shifted by zero bits and the other by a non-negative number of bits.) Bit-shift circuits 614 and 616 advantageously provide their outputs in (s2.22) format to avoid loss of numerical precision.

Fixed-point addition circuit 620 adds the shifted mantissa values provided by bit-shift circuits 614 and 618 to produce a new accumulated mantissa $\lambda_{A0}$ in (s2.22) format. In some embodiments, an overflow in fixed-point addition circuit 620 may result in $k_{A0}$ being incremented by 1 and $\lambda_{A0}$ being right-shifted by 1. In other embodiments, $k_{A0}$ can be selected so that such an overflow does not occur. It should be noted that as long as the weights $w_f$ implement a weighted average with the sum of all weights equal to 1.0 (as is usually the case for filtering) and all texture input values are finite (which is the case when the bypass signal is not asserted), the floating-point filter result remains finite. Thus, it is not necessary for addition module 608 to detect overflow situations in which the sum of two finite floating-point numbers results in a special number (e.g., NaN or INF) as is often done in general-purpose floating-point addition circuits.

When the bypass signal is not asserted, the new accumulated mantissa $\lambda_{A0}$ and the new accumulated block exponent $k_{A0}$ are selected by selection circuit 624 and written to registers 602 and 604, respectively.

When the bypass signal is asserted, the normal-case results $\lambda_{A0}$ and $k_{A0}$ are overridden by a special value, as will now be described. The special value $\lambda_S$ provided by special number circuit 504 (FIG. 5) on lines 522 is received at a format circuit 622, which reformats the fp16 value into a block exponent $k_{S0}$ and a mantissa $\lambda_{S0}$ in (s2.22) format. In one embodiment, $k_{S0}$ may be zero, and $\lambda_{S0}$ may include all bits of the fp16 representation of $\lambda_S$, with the remaining bits set to zero. In response to the asserted state of the bypass signal on line 524, selection circuit 624 selects the special-number results ($\lambda_{S0}$, $k_{S0}$), and these results are written to registers 602 and 604, respectively.

When a special number is written to register 602, a flag is advantageously set in a special flag register 626. Special flag register 626 can be used by various circuits to determine whether the value in register 602 is a normal mantissa or a special value, so that correct behavior for special numbers can be implemented. For example, addition circuit 620 may be configured to read special flag register 626 and to implement appropriate arithmetic rules for special numbers, e.g., that NaN added to any number results in NaN, etc. In some embodiments, whenever an INF or NaN value occurs as $\lambda_S$, the accumulated result will also be INF or NaN; accordingly, addition circuit 620 can be configured to simply pass through the special value $\lambda_A$ in the event that the special number flag in register 626 is set.

When accumulation is complete, registers 602 and 604 can be read out to format conversion stage 412 (FIG. 4) in response to control signals (not shown), which may be generated using conventional techniques. Additional control signals (not shown) may be provided for resetting the stored values in registers 602 and 604 (e.g., to zero) and special flag register 626 to initialize accumulator circuit 408.

In the case of fixed-point texture data, the same accumulator circuit 408 may also be used. For example, as described above prescaling block 506 (FIG. 5) may be configured to provide block exponent k=0 for each set of fixed-point inputs so that the "mantissas" (which, in this case, are fixed-point values) are not shifted. In one embodiment, special numbers are not defined in the fixed-point format, and the bypass signal would not be asserted during fixed-point accumulation; in other embodiments, special fixed-point numbers might be defined and detected.

It will be appreciated that the accumulator circuit described herein is illustrative and that variations and modifications are possible. In some embodiments, the accumulation circuit may include a general-purpose floating-point addition circuit, with each received ($\lambda_{fw}$, k) pair being converted to a suitable floating-point format prior to addition. Handling of special numbers may also be varied. For instance, the special-number bypass signal may be used to disable various elements of the accumulator circuit when the special value $\lambda_S$ is to be selected, or different rules for handling special numbers might be implemented. In other embodiments, separate fixed-point and floating-point accumulator circuits may be implemented.

Figure 7:
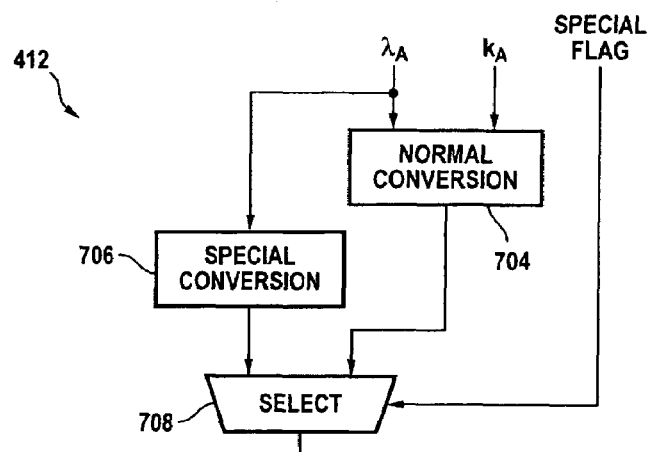
FIG. 7 is a block diagram of an output circuit according to an embodiment of the present invention.

FIG. 7 is a block diagram of a floating-point format conversion circuit 412 according to an embodiment of the present invention. After accumulation is complete, format conversion circuit 412 receives the final output values $\lambda_A$ and $k_A$ from registers 602 and 604 of accumulation circuit 408 (FIG. 6) and the special flag value from special flag register 626. Normal conversion circuit 704 and special conversion circuit 706 generate "normal" and special interpretations of the final output values $\lambda_A$ and $k_A$, respectively, in a desired output format (e.g., fp16). The correct interpretation is selected by a selection circuit 708 based on the special flag value.

More specifically, in one embodiment, normal conversion circuit 704 generates an fp16 value corresponding to $\lambda_A * 2^{k_A}$. Conventional format-conversion techniques may be used. Special conversion circuit 706 converts $\lambda_A$ to fp16 format (e.g., by dropping any extra bits that were added by format circuit 622 described above). Selection circuit 708 selects between the normal value provided by normal conversion circuit 704 and the special value provided by special conversion circuit 706 based on whether the special flag (from register 626) is asserted. This selection is provided to output selection circuit 414 (FIG. 4) as the floating-point filtered texture value $\lambda_O$. Other format conversion circuits may also be implemented for consistency with the internal and external floating-point formats in a particular embodiment. In some embodiments, the accumulator circuit maintains the accumulated result in the desired output format, and a separate format conversion stage may be omitted.

Thus, texture filtering unit 400 leverages a fixed-point Bilerp circuit to filter floating-point texture data and, for any floating-point inputs, can produce the same filtered result that would have been obtained using a floating-point Bilerp circuit. As described above, the behavior of a floating-point Bilerp circuit can be emulated for special number inputs as well as normal inputs. Those of ordinary skill in the art will recognize that underflows (e.g., fp16 Denorms) are inherently handled properly by the circuits described above. Thus, use of a fixed-point Bilerp circuit for filtering floating-point data need not result in loss of numerical precision. The fixed-point and floating-point formats described herein can include any number of bits; in particular, additional bits may be used internally in order to reduce or eliminate rounding errors and truncated at the output stage.

It will be appreciated that leveraging a fixed-point filter circuit to filter floating-point data as described herein allows the texture filter unit to be more compact than comparable units with a dedicated floating-point filter circuit. In addition, the texture filtering unit described herein is capable of handling fixed-point or floating-point texture data at the same rate. (The rate depends on implementation details such as the input texel bandwidth; for instance, in one embodiment, a rate of two Bilerp operations per clock is supported.) To match this performance, a design with a floating-point filter circuit would need to include a separate, parallel fixed-point filter path, which would further increase chip area.

While the invention has been described with respect to specific embodiments, one skilled in the art will recognize that numerous modifications are possible. For instance, any fixed-point filter circuit that implements a linear filtering algorithm can be used in place of the Bilerp circuit described herein. The fixed-point filter circuit may be configured to filter any number of input values and may also be used to implement filters involving fewer input values, e.g., by setting values for any unused inputs to zero. In some embodiments, the accumulator circuit may be configured to accumulate filter results received from multiple fixed-point filter circuits that operate in parallel instead of or in addition to accumulating multiple results from one fixed-point filter circuit.

The texture values provided to the texture filter unit may include any texel attribute including but not limited to colors or color components, surface normals (or components thereof), and the like. In some embodiments, the texture filtering unit may be configured to filter multiple attributes in parallel.

Fixed-point and floating-point numbers may be expressed in any desired format, not limited to the particular examples described herein. The texture filter unit, or any component thereof, may use an internal representation for fixed-point and/or floating-point numbers that is identical to or different from the external representation. In some embodiments, multiple alternative floating-point (or fixed-point) formats may be supported, and appropriate format signals and/or reformatting units may be included to control and/or perform appropriate format conversions.

The various circuits described herein can be implemented using conventional techniques and may include, e.g., ASICs, programmable circuits configured with suitable program code, and other devices; electronic, optical, and/or mechanical circuit technologies may be used as desired. It is to be understood that while the present description makes reference to various functional blocks, these blocks are used solely for purposes of description and are not intended to limit the invention to particular physical configurations; circuitry implementing various operations may be shared or replicated among blocks as desired.

Graphics processors incorporating the texture filtering unit described herein may be adapted to a variety of computer systems, including general-purpose computer systems (desktops, laptops, etc.) and special-purpose computer systems (video game consoles, personal digital assistants, cell phones, etc.).

Thus, although the invention has been described with respect to specific embodiments, it will be appreciated that the invention is intended to cover all modifications and equivalents within the scope of the following claims.

What is claimed is:

1. In a graphics processor, a device for filtering floating-point texture data, the device comprising:
    a prescaling circuit configured to convert each one of a group of floating-point input texture values to a product of a fixed-point mantissa and a scaling factor, wherein the scaling factor is the same for each one of the group of floating-point input texture values;
    a fixed-point filtering circuit configured to compute a fixed-point filter output value from a plurality of fixed-point filter input values, the fixed-point filtering circuit being coupled to receive, as the fixed-point filter input values, the fixed-point mantissas for the group of floating-point input texture values; and
    an accumulator circuit coupled to receive the scaling factor from the prescaling circuit and the filter output value from the fixed-point filtering circuit, the accumulator circuit being configured to scale the filter output value by a reciprocal of the scaling factor, thereby generating a floating-point filter result.

2. The device of claim 1, wherein the accumulator circuit is further configured to accumulate a weighted sum of a plurality of floating-point filter results.

3. The device of claim 2, wherein each of the plurality of floating-point filter results is obtained by processing a group of texture values through the prescaling circuit and the fixed-point filtering circuit.

4. The device of claim 2, wherein each of the floating-point input texture values includes an exponent and wherein the prescaling circuit is further configured such that the scaling factor corresponds to a largest one of the exponents.

5. The device of claim 4, wherein the accumulator circuit includes:
    a storage circuit configured to store an accumulated floating-point filter result;
    a fixed-point multiplier circuit configured to multiply a current fixed-point filter output value received from the fixed-point filter circuit by a current weight, thereby computing a current mantissa; and
    a floating-point addition circuit configured to add a current floating-point value represented by the current mantissa and a current scaling factor received from the prescaling circuit to the accumulated floating-point filter result.

6. The device of claim 2, wherein the fixed-point filtering circuit is configured to implement a bilinear filter using four filter inputs.

7. The device of claim 6, wherein the accumulator circuit is further configured to compute a weighted average of floating-point filter results from two filter passes, thereby computing a trilinear filtered texture value.

8. The device of claim 6, wherein the accumulator circuit is further configured such that the weighted average corresponds to an anisotropically filtered texture value.

9. The device of claim 1, further comprising:
    a fixed-point input path configured to provide a group of fixed-point input texture values as the filter inputs to the fixed-point filtering circuit, the fixed-point input path being coupled to the fixed-point filtering circuit via a fixed-point input path that bypasses the prescaling circuit,
    wherein the device is configurable for operation using either fixed-point texture values or floating-point texture values as inputs.

10. The device of claim 9, wherein the accumulator circuit is further configured to be operable in either of a fixed-point mode and a floating-point mode.

11. The device of claim 10, wherein in the fixed-point mode, the accumulator circuit operates with the scaling factor equal to 1.

12. The device of claim 1, farther comprising:
    a special number logic circuit coupled to receive the input floating-point texture values and configured to assert a special value signal in the event that one of the input floating-point texture values corresponds to a predetermined special number,
    wherein the floating-point accumulator circuit is further configured to receive the special value signal and to provide a corresponding special number as the floating-point filter result in the event that the special value signal is asserted.

13. A graphics processor having a shader module for computing a fragment color, the shader module comprising:
    a texture fetch unit configured to fetch a plurality of texture values corresponding to a fragment and to determine whether the fetched texture values are in a fixed-point format or a floating-point format; and
    a texture filter unit coupled to receive the fetched texture values from the texture fetch circuit and configured to apply a filter to the fetched texture values, thereby generating a filter result, the texture filter unit being operable in either of a fixed-point mode and a floating-point mode,
    wherein the texture filter unit operates in the fixed-point mode in the event that the fetched texture values are in the fixed-point format and in the floating-point mode in the event that the fetched texture vales are in the floating-point format,
    wherein the texture filter unit includes:
        a prescaling circuit configured to convert each one of a group of floating-point input texture values to a product of a fixed-point mantissa and a scaling factor,
    wherein the scaling factor is the same for each one of the group of floating-point input texture values;
        a fixed-point filtering circuit configured to compute a fixed-point filter output value from a plurality of fixed-point filter input values, the fixed-point filtering circuit being coupled to receive, as the fixed-point filter input values, the fixed-point mantissas for the group of floating-point input texture values; and an accumulator circuit coupled to receive the scaling factor from the prescaling circuit and the filter output value from the fixed-point filtering circuit, the floating-point accumulator circuit being configured to scale the filter output value by a reciprocal of the scaling factor, thereby generating a floating-point filter result.

14. The graphics processor of claim 13, wherein the texture filter unit further includes a fixed-point input path configured to provide a group of fixed-point input texture values as the filter inputs to the fixed-point texture filtering circuit, the fixed-point input path being coupled so as to bypass the prescaling circuit.

15. The graphics processor of claim 14, wherein the accumulator circuit is further configured to be operable in either of a fixed-point mode and a floating-point mode.

16. The graphics processor of claim 14, wherein the texture fetch unit further includes:

an input selection circuit configured to select one of the prescaling circuit and the fixed-point input path as a source for the filter inputs to the fixed-point filtering circuit; and an output selection circuit configured to select, as a final result, one of the floating-point filter result from the floating-point accumulator circuit and the fixed-point filter result from the fixed-point accumulator circuit, wherein the floating-point filter result is selected by the output selection circuit in the event that the prescaling circuit is selected by the input selection circuit and the fixed-point filter result is selected by the output circuit in the event that the fixed-point input path is selected by the input selection circuit.

17. The graphics processor of claim 16, wherein the input selection circuit and the output selection circuit are controlled by a format signal, and wherein the texture fetch unit is configured to generate the format signal based on the determination of whether the fetched texture values are in the fixed-point format or the floating-point format.

18. A method for filtering texture data in a graphics processor, the method comprising the acts of:

(a) receiving a group of floating-point texture values;

(b) determining a scaling factor for the group of received texture values;

(c) scaling each of the received texture values by the scaling factor;

(d) converting each of the scaled texture values to a fixed-point format;

(e) providing the converted texture values as filter inputs to a fixed-point texture filtering circuit configured to compute a fixed-point filter output from a plurality of filtered inputs;

(f) receiving a filter output in a fixed-point format from the texture filtering circuit;

(g) scaling the filter output value by a reciprocal of the scaling factor, thereby generating a floating-point filter result;

(h) computing a pixel value using the floating-point filter result; and (i) storing the pixel value in a memory.

19. The method of claim 18, further comprising the acts of:

(j) determining whether any of the received texture values corresponds to a predetermined special number; and (k) providing a special number as the floating-point filter result in the event that one or more of the received texture values corresponds to a predetermined special number.

20. The method of claim 18, further comprising the act of:

(j) accumulating, in a floating-point accumulator circuit, a weighted sum of a plurality of filter results, wherein each of the plurality of filter results is obtained by the acts (a) through (g).

21. The method of claim 18, further comprising the acts of:

(j) receiving a group of fixed-point texture values;

(k) providing the fixed-point texture values as filter inputs to the fixed-point texture filtering circuit; and (l) receiving a filter output in a fixed-point format from the texture filtering circuit.

22. The method of claim 21, farther comprising:

(m) accumulating, in a fixed-point accumulator circuit, a weighted sum of a plurality of filter outputs, wherein each of the plurality of filter outputs is obtained by the acts (j)-(l).

* * * * *